United States Patent
Egedal et al.

(10) Patent No.: US 9,447,773 B2
(45) Date of Patent: Sep. 20, 2016

(54) ARRANGEMENT TO MEASURE THE DEFLECTION OF A BLADE OF A WIND TURBINE

(71) Applicants: Per Egedal, Herning (DK); Jesper Winther Staerdahl, Sunds (DE); Andreas Ziroff, Munich (DE)

(72) Inventors: Per Egedal, Herning (DK); Jesper Winther Staerdahl, Sunds (DE); Andreas Ziroff, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 330 days.

(21) Appl. No.: 14/181,689

(22) Filed: Feb. 16, 2014

(65) Prior Publication Data
US 2014/0266861 A1 Sep. 18, 2014

(30) Foreign Application Priority Data
Mar. 14, 2013 (EP) .................................... 13159226

(51) Int. Cl.
| | |
|---|---|
| *G01S 7/40* | (2006.01) |
| *F03D 7/06* | (2006.01) |
| *G01B 15/06* | (2006.01) |
| *G01S 13/08* | (2006.01) |

(52) U.S. Cl.
CPC ................. *F03D 7/06* (2013.01); *F03D 17/00* (2016.05); *G01B 15/06* (2013.01); *G01S 13/08* (2013.01); *F05B 2270/17* (2013.01); *Y02E 10/722* (2013.01)

(58) Field of Classification Search
CPC ...... F03D 7/06; F03D 11/0091; G01S 13/08; G01B 15/06; Y02E 10/722; F05B 2270/17
USPC .............. 342/118, 104, 106, 107, 109, 114, 342/173–174, 61; 290/55
See application file for complete search history.

(56) References Cited

U.S. PATENT DOCUMENTS

| | | | | |
|---|---|---|---|---|
| 8,319,361 B2 | 11/2012 | Lucks | | |
| 8,816,519 B2* | 8/2014 | Wibben | ................ | F03D 7/0224 290/44 |
| 2004/0057828 A1* | 3/2004 | Bosche | ................ | F03D 7/0204 416/1 |
| 2007/0057516 A1* | 3/2007 | Mever | ................... | F03D 7/0224 290/44 |
| 2007/0098551 A1* | 5/2007 | Viertl | ...................... | F03D 11/00 416/61 |
| 2007/0170724 A1* | 7/2007 | Calley | ................... | F03D 7/0256 290/44 |

(Continued)

FOREIGN PATENT DOCUMENTS

| | | |
|---|---|---|
| DE | 102006054667 A1 | 5/2008 |
| EP | 2485011 A1 | 8/2012 |

(Continued)

*Primary Examiner* — John B Sotomayor
(74) *Attorney, Agent, or Firm* — Beusse Wolter Sanks & Maire

(57) ABSTRACT

An arrangement to measure deflection of a blade of a wind turbine is provided. A transmitter is arranged close to the tip end of the blade, while a receiver is arranged close to the root end of the blade. The transmitter and receiver are prepared for a wireless transfer of a monitoring signal, which is sent from the transmitter to the receiver. A monitoring system is arranged close to the root end of the blade. The monitoring system is adapted to generate the monitoring signal. The monitoring system is connected with the transmitter by a cable-bound communication line, thus the monitoring signal is transferred from the monitoring system to the transmitter. The monitoring system is connected with the receiver, thus the monitoring signal is transferred from the receiver to the monitoring system. The monitoring system is adapted to determine the deflection of the blade based on the transferred monitoring signal.

15 Claims, 1 Drawing Sheet

(56) References Cited

U.S. PATENT DOCUMENTS

| | | | |
|---|---|---|---|
| 2008/0101930 A1* | 5/2008 | Bosche | F03D 7/0204 416/31 |
| 2009/0317250 A1* | 12/2009 | Gamble | F03D 1/0658 416/1 |
| 2010/0124498 A1* | 5/2010 | Kabatzke | F03D 7/047 416/61 |
| 2011/0150647 A1 | 6/2011 | Gierlich | |
| 2011/0229322 A1* | 9/2011 | Tadayon | F03D 1/065 416/91 |
| 2012/0070285 A1* | 3/2012 | Cousineau | F03D 7/0224 416/31 |
| 2012/0134803 A1* | 5/2012 | McGrath | F03D 7/0252 416/1 |
| 2012/0134814 A1* | 5/2012 | McGrath | F03D 7/0252 416/23 |
| 2012/0251317 A1* | 10/2012 | Reitmaier | F03D 7/047 416/61 |
| 2013/0259686 A1* | 10/2013 | Blom | F03D 7/0276 416/1 |
| 2013/0307270 A1* | 11/2013 | Steen | F03D 11/00 290/44 |
| 2014/0028025 A1* | 1/2014 | Ibendorf | F03D 7/0224 290/44 |
| 2014/0054892 A1* | 2/2014 | Brown | F03D 7/0224 290/44 |
| 2014/0266861 A1* | 9/2014 | Egedal | F03D 11/0091 342/118 |
| 2015/0016976 A1* | 1/2015 | Roer | F03D 9/002 415/182.1 |
| 2015/0110596 A1* | 4/2015 | Huang | F03D 7/0264 415/1 |
| 2015/0337806 A1* | 11/2015 | Damgaard | F03D 7/047 700/287 |

FOREIGN PATENT DOCUMENTS

| | | |
|---|---|---|
| WO | 2008119354 A2 | 10/2008 |
| WO | 2011023588 A2 | 3/2011 |

\* cited by examiner

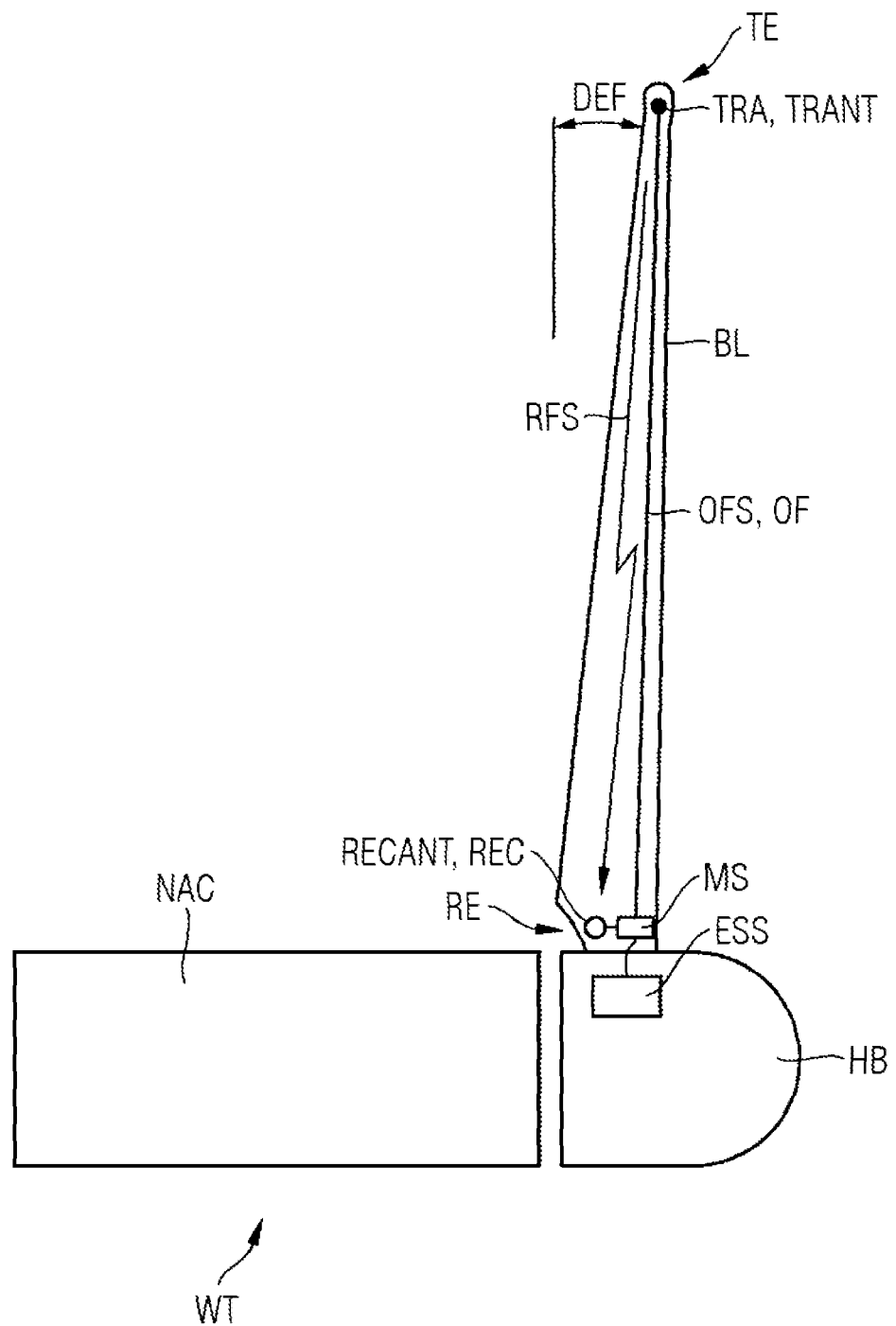

ARRANGEMENT TO MEASURE THE DEFLECTION OF A BLADE OF A WIND TURBINE

CROSS REFERENCE TO RELATED APPLICATIONS

This application claims the benefit of European Application No. EP13159226 filed Mar. 14, 2013, incorporated by reference herein in its entirety.

FIELD OF INVENTION

The invention relates to an arrangement to measure the deflection of a blade of a wind turbine.

BACKGROUND OF INVENTION

Blades of modern wind turbines show a length of 45 meters or more. The blades are optimized in view to their weight, in view to their aerodynamic characteristics and in view to the most possible generation of electrical power, which is based on the blade-properties.

Thus the optimizations sooner or later will result in quite flexible and long blades. Due to the flexibility of the blades the problem arises that the tip ends of the turning blades of a wind turbine in operation might hit the tower.

The distance between the tower and the tip end of the blade is also called "blade tip/tower clearance".

It is known to measure the deflection of a turning blade by monitoring the tip-end of the blade.

One possibility is to attach strain gauges on the blade-surface. They are mainly used for test purposes to gather a certain knowledge about the blade when it is stressed by the rotational movement. The installation of gauges and the installation of a respective bus-system for the transmission of measured data are quite expensive and time extensive and elaborated. As the whole equipment of the system might be exposed to lightning strikes the whole system is inappropriate for a longer period of time.

Document DE 10 2006 054 667 A1 describes a warning system, which is arranged to prevent that turning rotor-blades of a wind turbine hit the wind turbine tower. The bending of a turning blade is determined by sensors. The sensors perform optical measurements, ultra-sonic measurements or RADAR-based measurements, which are used to determine the bending of the blade.

Document EP 2 485 011 A1 describes an arrangement to measure the deflection of a wind-turbine blade. A passive reflector is arranged at the tip end of the blade. An antenna-system is arranged at the top of the nacelle and close to the root end of the blade. The antenna system is built as a linear antenna system and contains a transmit antenna and a receive antenna. The passive reflector and the antenna-system are coupled by a radio signal, which is sent from the transmit antenna via the reflector towards the receive antenna. The receive antenna is connected with an evaluation unit, which is prepared to measure the deflection of the blade based on determined phase-angles of the received radio signal.

The solutions as described in DE 10 2006 054 667 A1 and in EP 2 485 011 A1 result in a "blade tip/tower clearance", which is not accurate enough as these solutions trust in passive elements like reflectors and sensors.

SUMMARY OF INVENTION

It is therefore an aim of the invention to provide an improved arrangement to measure the deflection of a blade of a wind-turbine in a high and accurate manner.

This aim is reached by the features of the independent claim. Preferred embodiments of the invention are addressed by the dependent claims.

According to the arrangement herein, the deflection of a blade of a wind turbine is determined. A transmitter is arranged close to the tip end of the blade, while a receiver is arranged close to the root end of the blade. The transmitter and the receiver are prepared for a wireless transfer of a monitoring signal, which is sent from the transmitter to the receiver.

A monitoring system is arranged close to the root end of the blade. The monitoring system is prepared to generate the monitoring signal.

The monitoring system is connected with the transmitter by a cable-bound communication line, thus the monitoring signal is transferred from the monitoring system to the transmitter. The monitoring system is even connected with the receiver, thus the monitoring signal is transferred from the receiver to the monitoring system.

The monitoring system is prepared to determine the deflection of the blade based on the transferred monitoring signal.

The arrangement allows the determination of accurate results in view to the blade deflection. Thus the "blade tip/tower clearance" can be kept by optimized wind turbine blades.

The arrangement is based on active components resulting in accurate information about the blade-deflection.

The arrangement allows the reduction of complexity of the blades. There is no longer the need to waste blade material in an excessive manner only to reduce the blade-deflection. Thus costs and even the mass of the rotor can be reduced resulting in a more balanced rotor-arrangement.

Due to this even the gravity loads, acting on the rotor and its bearings, are reduced enhancing the reliability and the live-time of the wind turbine.

Additionally a pre-bending of the blade, which is used today to increase the "blade tip/tower clearance", can be reduced too. Thus transportation problems, which occur for pre-bended blades, are reduced or even avoided.

In a preferred configuration the monitoring system is connected with an emergency-stop-system. The emergency-stop-system is arranged and prepared to stop the wind turbine operation as soon as the deflection of the blade exceeds a certain threshold value.

Thus in worst case a quite fast emergency stop of the wind turbine can be initiated.

The emergency-stop-system is part of an improved safety system as the blade deflection is continuously monitored.

A safe stop sequence is initiated if the blade deflection exceeds a given threshold value.

Thus the stiffness of the blade can be reduced by a certain reduction of blade-material. This results in an improved blade-flexibility and in turn in reduced costs for the manufacturing of blades.

The combination of the blade deflection and the combination of this knowledge with the emergency-stop-system result in a cheap, easy and accurate wind turbine safety system.

In a preferred configuration the transmitter, the receiver and the monitoring system are part of an active radar-system.

In a preferred configuration of the active radar system solution the monitoring system is prepared to determine the deflection of the blade based on angle-of-arrival data of the transferred monitoring signal.

In a preferred configuration of the active radar system solution the monitoring system is prepared to determine the deflection of the blade based on time-of-flight data of the transferred monitoring signal.

A very sensitive way of processing the time-of-flight data is a phase analysis of the received monitoring signal. This allows tracking the phase over time and allows the measurement of the changing distances between the transmitter and the receiver (i.e. the distances between the antenna of the receiver and the antenna of the transmitter) with an accuracy of a fraction of a wavelength.

A very elaborate way of doing phase analysis is known as "Range-Doppler processing" which is preferably used in combination with this configuration.

In a preferred configuration of the active radar system solution the monitoring system is prepared to determine the deflection of the blade based on the measured distance between the transmitter and the receiver, while using the distance as an equivalent characteristic for the blade deflection.

For example the distance between the antenna of the receiver and the antenna of the transmitter can be measured.

The monitoring system compares the measured distance with a pre-determined minimum distance. If the measured distance falls below the minimum distance a stronger deflection than allowed is detected thus the emergency-stop-system is triggered. In turn the operation of the wind turbine is stopped.

In a preferred configuration of the active radar system solution the monitoring system is prepared to determine the deflection of the blade based on measured changes of the angle under which the position of the transmitter is seen from the position of the receiver. These changes of the angle are used as equivalent characteristics for the blade deflection.

In a preferred configuration the monitoring system is connected by a cable-bound communication line with the receiver.

In a preferred configuration the monitoring system is connected with the transmitter by an optical fiber, which is part of an optical communication system.

This forms the basis for the transfer of an optical modulated signal, which is used as monitoring signal, from the monitoring system to the transmitter. Due to the signal modulation the transfer of the monitoring signal is safe and is not prone to failure.

Even simple optical detection devices can be used at the transmitter. Thus the reconstruction of the monitoring signal based on the transferred optical modulated signal is quite easy and cheap.

The optical transfer even allows a galvanic decoupling of the transmitter on the one hand and of the receiver and the monitoring system on the other hand.

Due to the optical connection and due to the wireless connection the lightning protection of the system is enhanced while the components used are not exposed to lightning striking into the blade surface.

In a preferred configuration the transmitter is prepared for a radio-frequency-transmission of the monitoring signal to the receiver. Even the receiver is prepared to receive the monitoring signal, which is transmitted as radio-frequency-signal by the transmitter.

Thus the transmission can be established by cheap and reliable components and well known transmission techniques.

In a preferred configuration the transmitter is arranged within the blade at the tip end of the blade.

In a preferred configuration the receiver is arranged within the blade at the root-end of the blade additionally.

In a preferred configuration even the monitoring system is arranged within the blade at the root-end of the blade and close to the receiver.

Thus all relevant components of the system are protected from environmental influences increasing the live-time of the whole measurement- and safety system.

As the receiver is arranged at the root-end of the blade the accuracy of the determined deflection is increased.

Due to their location at the root end of the blade there is a quite good and easy access to the receiver and to the monitoring system for the execution of maintenance services if needed.

In a preferred configuration the receiver and the monitoring system are combined into an integrated device. Thus a coherent reception is established enhancing the accuracy of the determination of the deflection even in view of the "time-of-flight measurements" described above.

In a preferred configuration the receiver and the monitoring system are not combined thus the transmitted monitoring signal is generated within the monitoring system but remote from the transmitter and the receiver. The monitoring system as well as the receiver are arranged at the blade.

Thus the "angle-of-arrival detection" as described above is allowed while there is not the need to transmit any signals from the nacelle i.e. and the rotating blades via some sort of a rotary joint. Thus the reliability and the live-time of the deflection-detection-arrangement are increased.

The arrangement invented even allows the monitoring of the blade deflection when if the wind turbine is stopped. All relevant components are a well integrated part of the wind turbine, thus the arrangement is "long-time fully functional".

Due to the radar signals used the whole system is very reliable even in bad weather conditions.

Furthermore the whole system provides a high accuracy and sampling rate and does not require any kind of elaborate image processing.

Preferably the receiver and the transmitter are coupled by a number of monitoring signals. Thus the blade-deflection detection is enhanced and the gathered results are quite reliable.

Preferably each blade of the wind turbine contains the arrangement invented. Thus the blade-deflection detection is enhanced and the gathered results are quite reliable in view to each blade.

Preferably the transmitter is prepared to modulate the wireless transmitted monitoring signal thus the results are more exact.

BRIEF DESCRIPTION OF THE DRAWINGS

FIG. 1 shows an embodiment of the arrangement.

DETAILED DESCRIPTION OF INVENTION

FIG. 1 shows one preferred arrangement according to the invention and shall not limit the basic idea and the scope of the invention.

The wind turbine WT, which is shown in this FIGURE in a "cut-out" manner, shows a nacelle NAC, a hub HB and a blade BL.

A transmitter TRA with an integrated antenna TRANT is arranged close to the tip end of the blade.

The transmitter TRA is preferably arranged into a blade-cavity, which extends from the root end RE of the blade BL to the tip end TE of the blade BL.

A receiver REC with an integrated antenna RECANT is arranged at the root end RE of the blade BL.

The receiver REC is preferably arranged into the blade-cavity, which extends from the root end RE of the blade BL to the tip end TE of the blade BL.

The transmitter TRA and the receiver REC are prepared for a radio-frequency-based signal transfer of a monitoring signal. The monitoring signal, which is transferred via the RF-connection from the transmitter TRA to the receiver REC is labeled as monitoring signal RFS.

A monitoring system MS is arranged close to the receiver REC and into the blade-cavity.

The monitoring system MS is prepared to generate monitoring signals RFS and OFS being used.

The monitoring system MS is connected with the transmitter TRA by an optical fiber OF. Thus a monitoring signal OFS is transferred from the monitoring system MS to the transmitter TRA via the optical fiber OF.

The monitoring system MS is connected with the receiver REC, thus the monitoring signal, which is received by the receiver REC as signal RFS, is transferred from the receiver REC to the monitoring system MS.

The monitoring system MS is prepared to determine the deflection DEF of the blade BL based on the transferred monitoring signals OFS and RFS.

The monitoring system MS is connected with an emergency-stop-system ESS. The emergency-stop-system ESS is arranged and prepared to stop the operation of the wind turbine WT as soon as the deflection DEF of the blade BL exceeds a certain threshold value.

The monitoring signal OFS, being send through the optical fiber OF, might contain one or multiple laser pulses.

The receiver REC and the transmitter TRA are part of an active radar system. The transmitter TRA converts the laser pulse into the monitoring signal RFS, used as radar-signal in the radar-system.

The radar-signals are received by the antenna RECANT of the receiver REC. The radar-signal is converted and is passed on to the monitoring system MS.

Based on the received radar-signal, the "time of flight" or the "angle-of-arrival" is calculated.

If one of these values is outside pre-defined threshold values a stop signal is initiated and sent to the emergency-stop-system ESS.

The blade BL will be pitched to a stop position for example, to stop the operation of the wind turbine.

As an option, an "early warning signal" could be sent to the wind turbine controller, as soon as the pre-defined threshold values are approached within a pre-defined period of time. Based on this "early warning signal" the blade pitch position can be adjusted in due time to reduce the wind load acting on the blade and thus to reduce the blade deflection as well.

The invention claimed is:

1. An arrangement to measure deflection of a blade of a wind turbine, comprising
    a transmitter positioned at a tip end of and within the blade;
    a receiver positioned at a root end of and within the blade; and
    a monitoring system arranged at the root end of and within the blade, wherein the monitoring system generates a monitoring signal;
    wherein the monitoring system is connected to the transmitter by a cable-bound communication line through which the monitoring signal is transferred from the monitoring system to the transmitter at the tip end of the blade,
    wherein the transmitter transmits a radio-frequency-transmission of the monitoring signal to the receiver,
    wherein the receiver receives the monitoring signal transmitted as the radio-frequency transmission by the transmitter,
    wherein the monitoring system is connected to the receiver and the monitoring signal is transferred from the receiver to the monitoring system, and
    wherein the monitoring system determines the deflection of the blade based on the monitoring signal from the receiver.

2. The arrangement according to claim 1,
    wherein the monitoring system is connected with an emergency-stop system, and
    wherein the emergency-stop system stops the wind turbine operation as soon as the deflection of the blade exceeds a certain threshold value.

3. The arrangement according to claim 1, wherein the transmitter, the receiver and the monitoring system are part of an active radar-system.

4. The arrangement according to claim 3, wherein the monitoring system determines the deflection of the blade based on angle-of-arrival data of the transferred monitoring signal.

5. The arrangement according to claim 3, wherein the monitoring system determines the deflection of the blade based on time-of-flight data of the transferred monitoring signal.

6. The arrangement according to claim 3, wherein the monitoring system determines the deflection of the blade based on a measured distance between the transmitter and the receiver, the distance being used as an equivalent characteristic for the deflection of the blade.

7. The arrangement according to claim 3, wherein the monitoring system determines the deflection of the blade based on measured changes of an angle under which a position of the transmitter is seen from a position of the receiver, the changes of the angle being used as an equivalent characteristic for the deflection of the blade.

8. The arrangement according to claim 1, wherein the monitoring system is connected by a cable-bound communication line to the receiver.

9. The arrangement according to claim 1, wherein the monitoring system is connected to the transmitter by an optical fiber, which is part of an optical communication system.

10. The arrangement according to claim 9, wherein the optical communication system transfers the monitoring signal as an optical modulated signal from the monitoring system to the transmitter.

11. The arrangement according to claim 1, further comprising a wind turbine controller,
    wherein the monitoring system is connected to the wind turbine controller,
    wherein the monitoring system initiates an early warning signal as soon as the deflection of the blade approaches within a pre-defined period of time a certain threshold value, while the early warning signal is transmitted to the wind turbine controller, and
    wherein the wind turbine controller adjusts a blade pitch position and, thus in turn, reduces the deflection of the blade in dependency on the early warning signal.

12. An arrangement to measure deflection of a blade of a wind turbine, comprising:

a transmitter arranged at a tip end of the blade, wherein the transmitter is arranged within the blade;

a receiver arranged at a root end of the blade, wherein the receiver is arranged within the blade;

a monitoring system arranged at the root end of the blade and within the blade, wherein the monitoring system being close to the receiver, the monitoring system to generate a monitoring signal, and the monitoring system is connected to the transmitter by an optical fiber, which is part of an optical communication system so that the monitoring signal is transferred from the monitoring system to the transmitter;

wherein the optical communication system transfers the monitoring signal as an optical modulated signal from the monitoring system to the transmitter;

wherein the transmitter, the receiver and the monitoring system are part of an active radar system;

wherein the transmitter transmits a radio-frequency transmission of the monitoring signal to the receiver;

wherein the receiver receives the radio-frequency transmission of the monitoring signal from the transmitter;

wherein the monitoring system is connected by a cable-bound communication line to the receiver, so that the monitoring signal is transferred from the receiver to the monitoring system; and wherein the monitoring system to determine the deflection of the blade based on an angle-of-arrival data of the monitoring signal transferred from the receiver to the monitoring system.

13. The arrangement according to claim 12, wherein the monitoring system is connected with an emergency-stop system and the emergency-stop system is arranged and prepared to stop operation of the wind turbine as soon as the deflection of the blade exceeds a certain threshold.

14. The arrangement according to claim 12, wherein the monitoring system to determine the deflection of the blade based on measured changes of an angle under which a position of the transmitter is seen from a position of the receiver, wherein the changes of the angle being used as an equivalent characteristic for the deflection of the blade.

15. The arrangement according to claim 12, wherein:
the monitoring system is connected with a wind turbine controller;
the monitoring system initiates an early warning signal as soon as the deflection of the blade approaches within a pre-defined period of time a certain threshold value, while the early warning signal is transmitted to the wind turbine controller; and
the wind turbine controller adjusts a blade pitch position and, thus in turn, reduces the blade deflection in dependency on the early warning signal.

* * * * *